Aug. 22, 1961   O. L. WELKER ET AL   2,997,661
SAFETY CIRCUIT FOR CONDITION RESPONSIVE OSCILLATOR
Original Filed May 3, 1955

INVENTORS
OSCAR L. WELKER
LESTER F. HETCHLER
BY
ATTORNEYS

United States Patent Office 2,997,661
Patented Aug. 22, 1961

2,997,661
SAFETY CIRCUIT FOR CONDITION RESPONSIVE OSCILLATOR
Oscar L. Welker, Rockford, Ill., and Lester F. Hetchler, Milwaukee, Wis., assignors to Barber-Colman Company, Rockford, Ill., a corporation of Illinois
Original application May 3, 1955, Ser. No. 505,674. Divided and this application Mar. 7, 1958, Ser. No. 719,851
3 Claims. (Cl. 331—62)

This invention relates generally to control apparatus of the type in which the oscillatory condition of a vacuum tube oscillator and thereby the output current of the latter are varied to perform a control function in accordance with changes in the value of a condition such as temperature being controlled. More particularly, the invention relates to a condition responsive oscillator having a load impedance in its output circuit and control elements in its input circuit for varying the current flow through the load impedance with changes in the oscillatory condition.

The primary object of the invention is to maintain safe operating conditions in the event of a failure in the oscillator input circuit where the condition responsive signal is applied.

A more detailed object is to detect a failure in the input circuit by a novel arrangement of elements which are inactive while the input circuit is intact but which, when the input circuit is interrupted, operate to bias the oscillator so as to reduce the current through the load impedance.

Other objects and advantages of the invention will become apparent from the following detailed description taken in connection with the accompanying drawings, in which—

Figure 1:
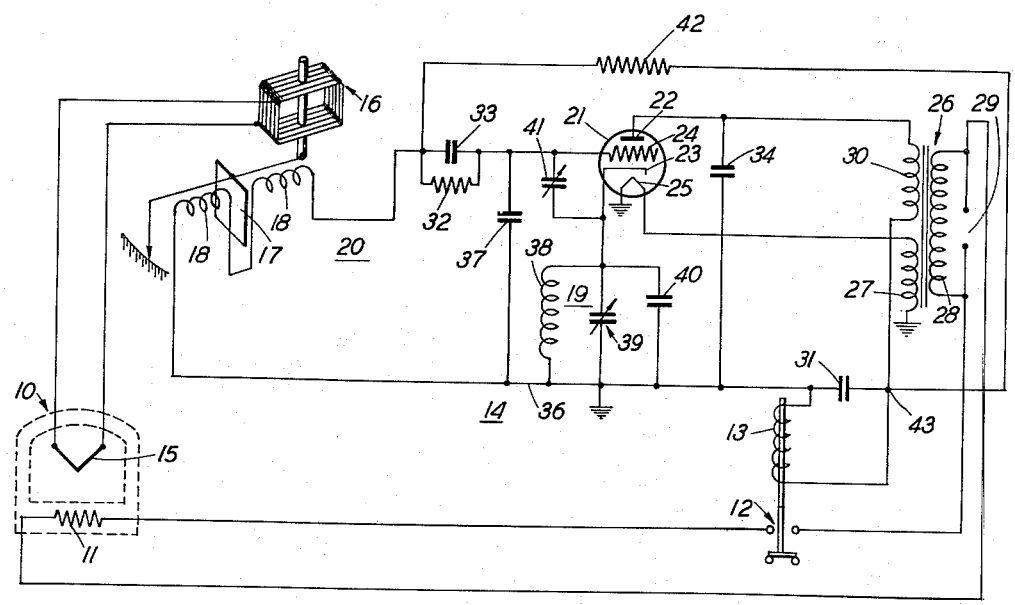
FIGURE 1 is a schematic wiring diagram of electrical control apparatus embodying the novel features of the present invention.

The invention is shown in the drawings for purposes of illustration embodied in a system for controlling the temperature of an electric furnace 10 having an electric resistance heater element 11. Energization of the latter is controlled by normally open contacts 12 of a relay 13 which constitutes a direct current load device in the output circuit of an oscillator 14. To operate the relay in response to changes in the furnace temperature, the voltage of a thermocouple 15 disposed within the furnace is applied to a galvanometer 16 of the D'Arsonval type having a moving system which carries a flag or vane 17 of non-magnetic conducting material such as aluminum. The latter is movable along a predetermined path relative to a pick-up coil 18 which is a part of one of two resonant circuits 19 and 20 of the oscillator 14 and is supported along the flag path to cooperate with the latter to change the effective inductance of the coil and thereby the oscillatory condition of the oscillator and the current flow in its output circuit through the relay 13 in response to changes in the furnace temperature. While this condition responsive variable reactance may be supplied by relatively movable capacitor plates, it is preferfed to use a variable inductance element as shown to reduce capacity losses in the lead lines where the element is located remotely from the oscillator.

Generally, the oscillator 14 comprises the two resonant circuits 19 and 20 and a vacuum tube 21 having an anode 22, a cathode 23, a control grid 24, and a separate heater filament 25 for the cathode. In this instance, one terminal of the filament is grounded and the other terminal is connected to ground through the secondary 27 of a transformer 26 whose primary 28 is connected to a suitable source 29 of voltage which preferably alternates at a commercially available frequency such as sixty cycles per second. The load or output circuit of the oscillator comprises the coil of the relay 13 in series with another secondary 30 of the transformer providing the anode power supply, a smoothing capacitor 31 being connected across the relay coil. The tube 21 preferably is a double triode such as a 12AU7 with the corresponding electrodes paralleled, but is shown for simplicity as a single triode.

The relay 13 is operated in accordance with changes in the oscillatory condition of the oscillator by connecting a grid leak resistor 32 and a capacitor 33 in parallel circuits between the grid 24 and the cathode 23 and utilizing grid rectified currents to apply a negative bias to the grid and reduce the current in the output circuit when the oscillator is oscillating. In the present instance, the resistor is connected directly across the capacitor. High frequency currents in the anode circuit resulting from oscillation are shunted around the anode power supply 30 and the relay 13 by a by-pass capacitor 34. When the oscillator is in a non-oscillatory condition, the charge on the capacitor 33 supplying the negative bias applied to the grid leaks off through the resistor 32 to permit rectified current to flow from the anode source 30 through the load relay 13 thereby energizing the latter to close the relay contacts 12 and complete an energizing circuit for the furnace heater 11 through the source 29.

The resonant circuits 19 and 20 are connected in series between the grid 24 and the cathode 23 and the oscillator output circuit is connected to the junction 36 between the resonant circuits thereby locating one circuit 19 in series with the cathode so that it is common to both the input circuit and the output circuit of the oscillator. The second tuned circuit 20 located between the junction 36 and the grid determines the frequency of oscillation of the oscillator while the first circuit 19 cooperates with the capacitance between the grid and the cathode to define a voltage divider which determines the feedback ratio of the oscillator. Such ratio is the proportion applied between the grid and the cathode of the total high frequency voltage appearing across the second tuned circuit.

In the present instance, the pick-up coil 18 comprises two separate halves or sections which are supported on opposite sides of the flag path and are connected between the junction 36 and the grid 23 in series with the grid leak resistor 32 and the capacitor 33 to constitute a part of the second tuned circuit 20. The latter is completed by a capacitor 37 which preferably is connected directly between the grid and the junction to render available between these points the full high frequency voltage of the tuned circuit without losses in the leads to the pick-up coil. Like the second circuit, the first tuned circuit 19 is a parallel resonant one comprising a coil 38 and two capacitors 39 and 40, one fixed and one variable, connected in parallel between the cathode and the junction. To permit adjustment of the tuning capacitor 39 safely without special insulated tools, the junction between the tuned circuits preferably is grounded as shown.

The values of the respective tuned circuit elements are such that, when the flag 17 is remote from the pick-up coil 18, the effective reactance of the first circuit 19 between the cathode 23 and the junction 36 is inductive in character so that no oscillations exist in the oscillator. Under this condition, the rectified current of the supply 30 through the relay 13 is at its maximum value and the relay pulls in to close its contacts 12 in the circuit of the furnace heater 11.

As the furnace temperature rises and the flag 17 approaches a predetermined control position between the sections of the coil 18, the inductance of the latter decreases thereby increasing the resonant frequency of the second tuned circuit 20. With this frequency increasing, the reactance of the first circuit becomes less and less inductive until, at the predetermined position, this reactance becomes capacitive in character. The condition of the oscillator 14 then becomes oscillatory with the strength of oscillations depending on the feedback ratio of the capacity between the cathode 23 and the junction 36 to that between the junction and the grid 24. Further movement of the flag beyond the control position continues to increase the resonant frequency thereby increasing the feedback ratio and the strength of the oscillations.

As discussed above, oscillations result in the application of a negative bias to the grid 24 by the grid leak resistor 32 and capacitor 33 to reduce the load current through the relay 13 when the oscillator 14 is oscillating. The amount of such bias and reduction of load current vary with the strength of the high frequency oscillations and therefore the position of the flag 17 relative to the pick-up coil 18. At a predetermined control value of the furnace temperature which is reached before the pick-up coil inductance reaches a minimum, the load current is reduced sufficiently that the relay drops out to interrupt the energizing circuit for the furnace heater 11.

Figure 2:
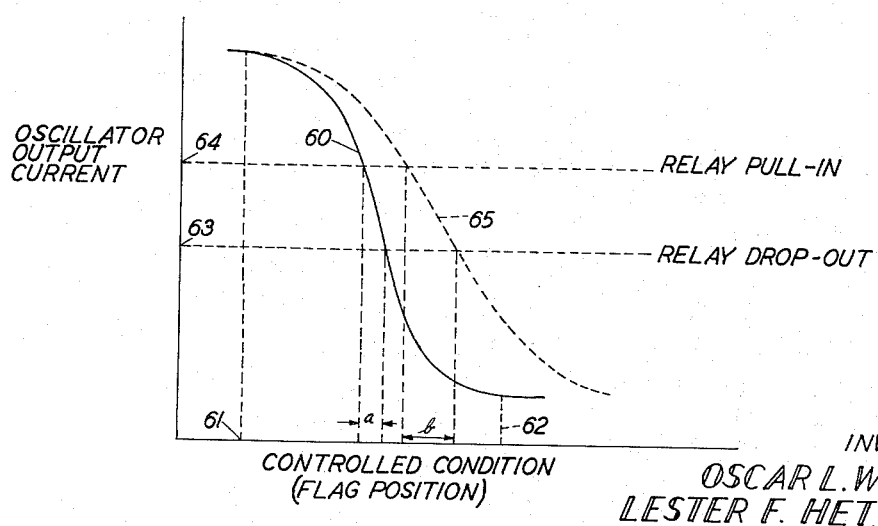
FIG. 2 is a plot of oscillator output current against a controlled condition.

Referring to FIG. 2 in which the curve 60 is a plot of the output current through the load relay 13 against either the furnace temperature or the flag position, it will be seen that the output current is a maximum when the temperature is below a value 61 and the flag is relatively remote from the pick-up coil, the oscillator then being non-oscillatory. As the temperature increases beyond this value and the flag moves into the coil or to the right along the abscissa of the chart of FIG. 2, oscillations begin as described above and, as the feedback ratio of the oscillator and the strength of the oscillations increase, the output current decreases along the curve 60 to a minimum at a temperature value 62. Energization and deenergization of the relay may occur at different points within this wide range of output current values. For example, deenergization of the relay may occur at an output current value 63 while energization or pull-in occurs at a higher value 64. For the circuitry described thus far, variation of the controlled condition or the flag position through a narrow range indicated at $a$ results in operation of the relay.

In one system constructed as described above and utilizing a 12AU7 tube with its electrodes paralleled, movement of the flag 17 relative to the pick-up coil 18 resulted in variation of the oscillator output relay current from a maximum of 13 milliamperes to a minimum of .5 of a milliampere where the anode source 30 supplied an alternating voltage of 260 volts at 60 cycles per second and the load relay resistance was approximately 10,000 ohms with its shunting capacitor 31 of a value of 8 microfarads. The operating frequency was between 26 and 27 megacycles and the values of the elements of the first resonant circuit 19 respectively were .5 of a microhenry for the coil 38, 22 micromicrofarads for fixed capacitor 40, and 8 to 50 micromicrofarads for the variable tuning capacitor 39. The values of the capacitor 37 and the by-pass capacitor 34 respectively were 10 micromicrofarads and .001 of a microfarad and the grid lead resistor 32 and capacitor 33 had values of 1.2 megohms and .02 of a microfarad respectively. In the second resonant circuit 20, the inductance of the pick-up coil 18 varied from 1.160 microhenries to .9445 of a microhenry with flag movement through a range of .3 of an inch, the change of inductance with flag movement being substantially linear over this range. With this system, a movement of the flag 17 as small as .006 of an inch accompanied by a change of pick-up coil inductance of only approximately .0043 of a microhenry was sufficient to actuate the relay from pull-in to drop-out and vice versa.

Since the strength of the high frequency oscillations and therefore the load current vary in accordance with the ratio of the capacitance between the cathode 23 and ground to the capacitance between the grid 24 and the cathode, variation of the rate of change of load current in response to flag movement may be accomplished by connecting a capacitor 41 externally between the grid and the cathode. This capacitor is added to the internal grid to cathode capacitance of the tube and increases the effective capacitance between the grid and the cathode and thereby the amount of capacitance between the cathode and ground required to produce a given feedback ratio. The capacity effective between the cathode and ground in turn varying with flag movement, a correspondingly larger movement is required to produce a given change of load current. Preferably, the external capacitor 41 is variable as shown to permit adjustment of the feedback ratio. The effect of adding the external capacitor 41 is illustrated in FIG. 2 in which the dotted curve 65 represents the variation of output current with furnace temperature when the capacitor is added. It will be seen that this curve is less steep than the curve 60 and that the range $b$ of temperature values and flag movement between pull-in and drop-out of the relay is much greater than the range $a$ without the capacitor.

In accordance with the present invention, novel means is provided to avoid the unsafe condition of pull-in of the relay 13 when a failure such as interruption of the circuit through the pick-up coil 18 occurs in the oscillator input. This means comprises a safety circuit which normally is inactive when the pick-up coil circuit is intact but which, when the coil circuit is interrupted, operates to bias the oscillator so as to reduce the current through the relay 13 to a value below its drop-out value 63. To apply such bias, the safety circuit extends between the grid 24 and a point in the output circuit having a negative potential relative to the cathode, the safety circuit having a high resistance to avoid interference with normal operation of the system when the pick-up coil circuit is intact.

The negative potential with respect to the cathode 23 is obtained in the oscillator output circuit by connecting the anode power supply 30 between the anode 22 and the load relay 13. With this arrangement, the flow of load current through the relay and the tube results in a voltage drop across the relay coil so that the junction 43 between the power supply and the relay is at a negative potential with respect to the cathode. The safety circuit for applying this potential to the grid 24 herein comprises a resistor 42 connected between the junction and the cathode side of the grid control capacitor 33. A suitable value for the bias resistor is 10 megohms.

When the pick-up coil circuit is intact and no oscillations exist, a negligible amount of direct current flows through the fail-safe resistor 42 and the pick-up coil 18 to ground. This is because the grid 24, in effect, then is short-circuited to the cathode 23 through the pick-up coil to permit current flow through the tube at a value sufficient for pull-in of the relay 13. When the pick-up circuit is interrupted, however, current flow in the output circuit at a value below that required for pull-in of the relay produces a negative potential at the anode terminal 43 of the relay. The only direct current path between the grid and the cathode under this condition extends through the fail-safe resistor 42 which thus applies the negative potential to the grid to maintain the relay deenergized.

This application is a division of our copending application Serial No. 505,674, filed May 3, 1955, now Patent No. 2,873,368, issued February 10, 1959.

We claim as our invention:

1. In control apparatus the combination of, an oscillator comprising a vacuum tube having an anode, a cathode, and a control grid and a resonant circuit connected between the grid and the cathode and including a variable reactance element, means for changing the effective reactance of said element to vary the oscillatory condition of the oscillator in accordance with changes of a variable condition, an output circuit for said oscillator including a source of voltage and a load impedance connected in series between said anode and said cathode with the source between the anode and the impedance, grid control elements connected between said cathode and said grid and operating to bias the grid negatively and reduce current flow through said load impedance in response to oscillation of the oscillator, the anode terminal of said impedance having a negative potential relative to the cathode terminal during current flow therethrough, and a safety circuit comprising a high series impedance coupled from said anode terminal of said load impedance to said grid for applying said negative potential to the latter to reduce the current flow through the load impedance when the circuit through said reactance element is interrupted and to permit said safety circuit control of said oscillator by said reactance element under normal operating conditions when said circuit through the element is completed.

2. In control apparatus, the combination of, an oscillator comprising a vacuum tube having an anode, a cathode, and a control grid and a resonant circuit connected between the grid and the cathode and including a variable reactance element, means for changing the effective reactance of said element to vary the oscillatory condition of the oscillator in accordance with changes of a variable condition, an output circuit for said oscillator including a source of voltage and a load impedance connected in series between said anode and said cathode with the source between the anode and the impedance, grid control elements connected between said grid and said cathode and operating to bias the grid negatively and reduce current flow through said load impedance in response to oscillation of said oscillator, the anode terminal of said impedance having a negative potential relative to the cathode terminal during current flow therethrough, and a resistor coupled from said anode terminal of said impedance to said grid for applying said negative potential to the latter to reduce the current flow through the impedance when the circuit through said reactance element is interrupted.

3. In control apparatus, the combination of, an oscillator comprising a vacuum tube having an anode, a cathode, and a control grid and a normally closed input circuit, means for varying the condition of said input circuit to change the oscillatory condition of the oscillator in accordance with changes of a variable condition, an output circuit for said oscillator including a source of voltage and a load impedance connected in series between said anode and said cathode with the source between the anode and the impedance, grid control elements connected to said input circuit and operating to bias said grid negatively and reduce current flow through said load impedance during oscillation of said oscillator, the anode terminal of said impedance having a negative potential relative to the cathode terminal during current flow therethrough, and a safety circuit comprising a relatively high resistance extending from said anode terminal of said impedance to said grid for applying said negative potential to the latter to reduce the current flow through the impedance below a predetermined value when said input circuit is interrupted.

References Cited in the file of this patent

UNITED STATES PATENTS

| | | |
|---|---|---|
| 1,975,812 | Wallace | Oct. 9, 1934 |
| 2,234,184 | MacLaren | Mar. 11, 1941 |
| 2,261,153 | Gieringer | Nov. 4, 1941 |
| 2,600,928 | Semm | June 17, 1952 |